Sept. 12, 1933.        E. F. WESTON         1,926,640
           ELECTRICAL MEASURING INSTRUMENT
                Filed March 29, 1930      2 Sheets-Sheet 1
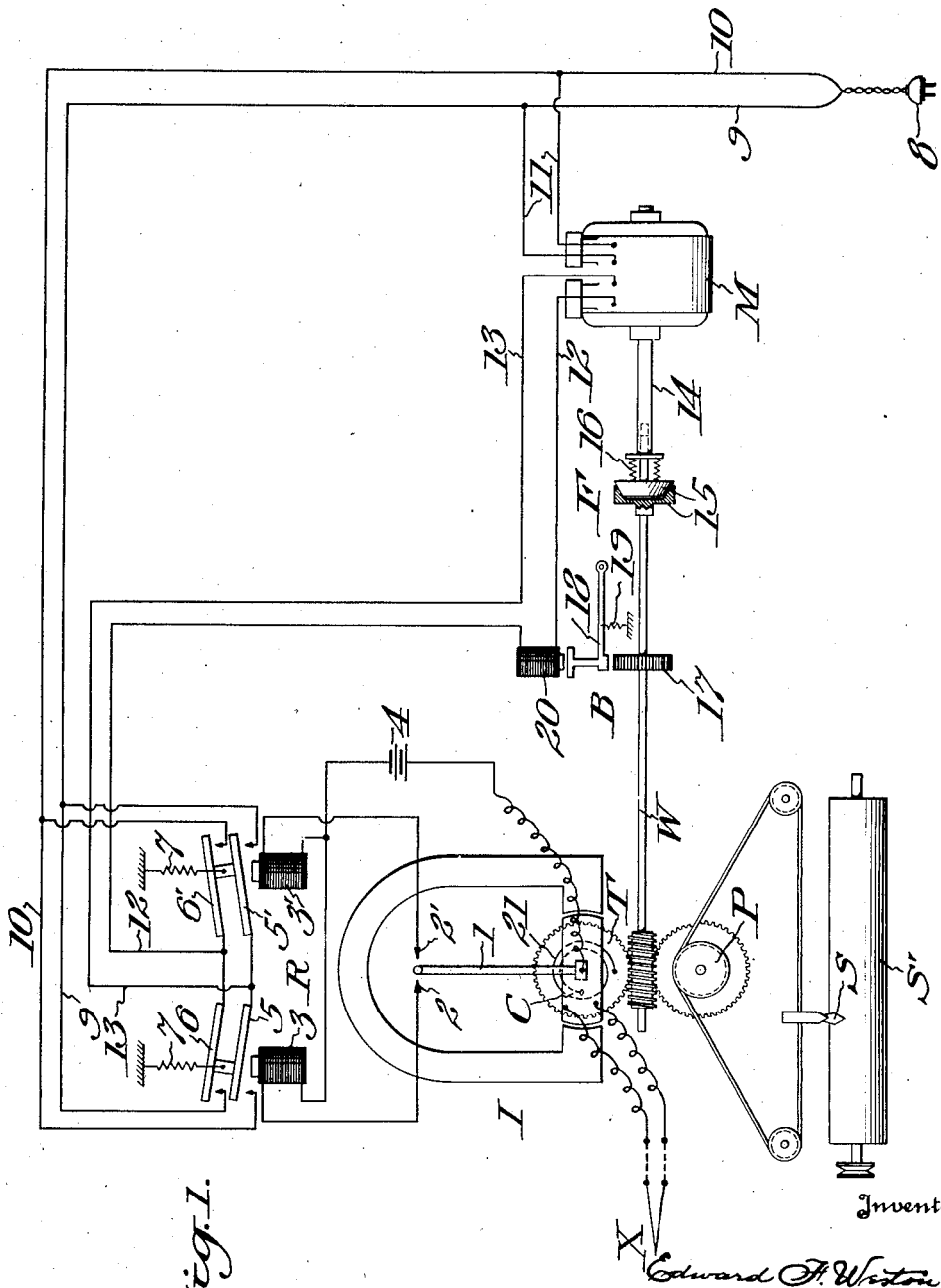

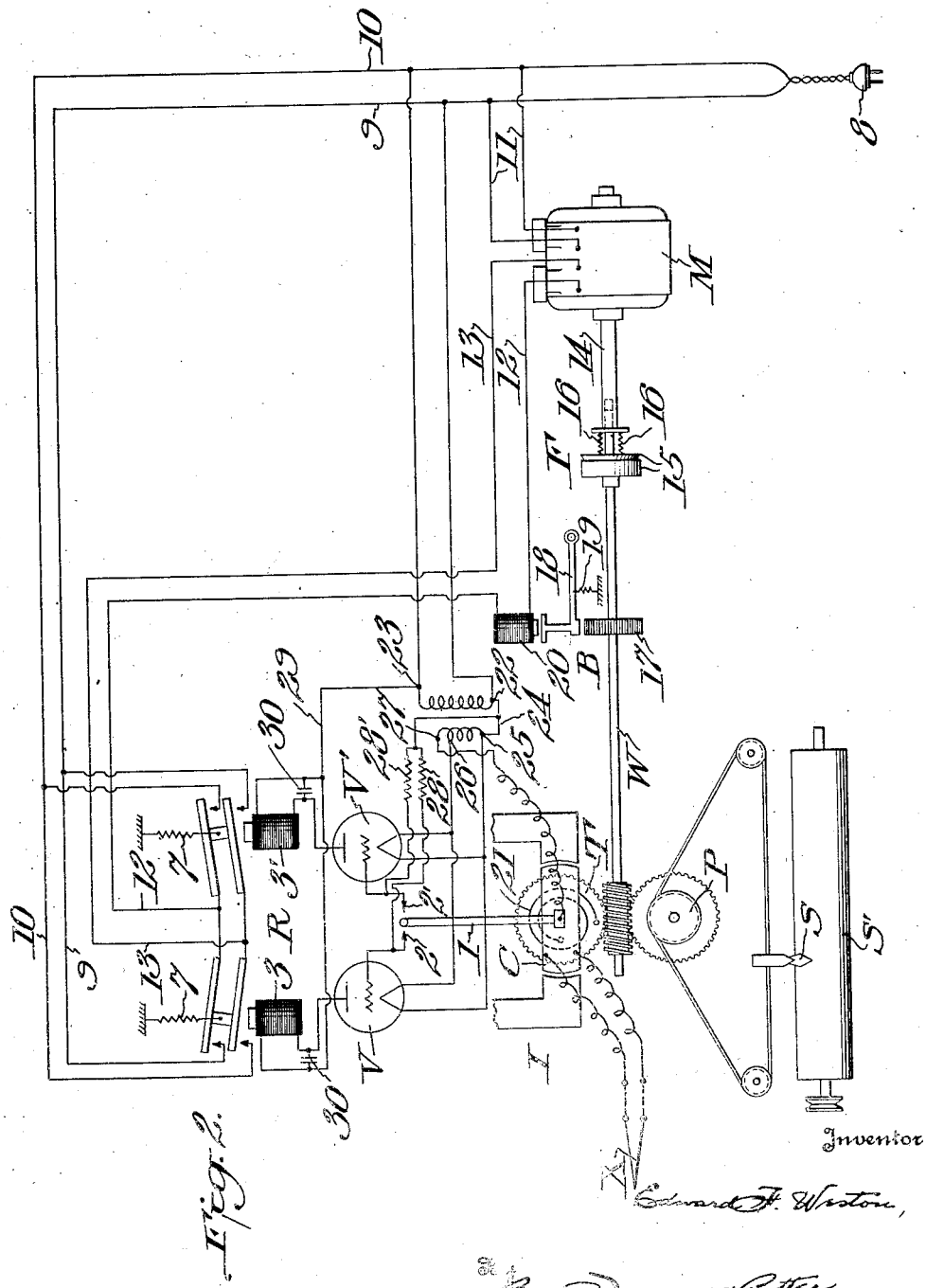

Patented Sept. 12, 1933

1,926,640

UNITED STATES PATENT OFFICE 1,926,640

ELECTRICAL MEASURING INSTRUMENT

Edward F. Weston, Newark, N. J., assignor to Weston Electrical Instrument Corporation, Newark, N. J., a corporation of New Jersey Application March 29, 1930. Serial No. 440,047

14 Claims. (Cl. 234—5.5)

This invention relates to electrically-operated recorders and particularly to recorders of the type in which the pointer or contact arm of an electrical measuring instrument controls relay circuits for determining the direction and the extent of movement of a stylus upon a record sheet.

Recorders of this general type are described in the United States patents to Weston et al., Nos. 713,257 and 713,258, granted Nov. 11, 1902. As the electrical quantity varies in magnitude, the contact arm of the measuring instrument closes one of two relay circuits to energize the motor circuit to drive the stylus in the appropriate direction. This movement of the stylus is accompanied by a rotation of the torsion head of the measuring instrument (or by adjustment of a potentiometer) such that the contact arm breaks the relay circuit when the stylus is moved to a position corresponding to the then existing magnitude of the electrical quantity.

Recorders of this type have gone into extended use but are subject to definite mechanical limitations. For example, it is impossible to obtain accurate records of small period fluctuations since the rate of movement of the stylus must be kept comparatively low to prevent "over-running" of the stylus when the relay circuit is broken. Furthermore, the recording of minute changes in current, voltage or the like is impractical since the pitting of the relay contacts prevents reliable operation when a measuring instrument of high sensitivity is employed.

In another type of recorder which has been developed commercially, high sensitivity has been obtained by employing mechanical transmission between the instrument pointer and the stylus, but the inertia of the mechanical transmission renders it impossible to actuate the stylus at high speed.

So far as I am aware, the highest stylus speed which has been obtained in commercial recorders has been of the order of something less than one inch per second, and even at this relatively low speed, the stylus will frequently overrun and produce inaccurate records.

An object of the invention is to provide a recording electrical measuring instrument in which the stylus will accurately record the changing value of an electrical quantity even when the magnitude of the electrical quantity changes at a rapid rate. A further object is to provide a recorder employing an electrical measuring instrument and electrical relays of high sensitivity for operating a stylus to record the changing values of an electrical quantity.

A further object of the invention is to provide a recording electrical measuring instrument in which accurate records may be obtained when the stylus is operated at high speed, i. e., at speeds of an order substantially higher than one inch per second.

More specifically, an object is to provide a recorder of the type stated in which the relay circuits controlling the operation of the stylus also control a brake operative to arrest the stylus movement, a friction drive being arranged between the driving motor and the stylus drive to permit the normal slowing down of the motor when the relay circuits are opened and the brake is applied to the stylus drive.

These and other objects of the invention will be apparent from the following specification when taken with the accompanying drawings in which:

Figs. 1 and 2 are diagrammatic views of the electrical circuits and the essential mechanical elements of recorders embodying the invention.

In the schematic arrangements of both Figs. 1 and 2, the principal elements of the recorder are shown as an electrical indicating instrument I which, through a relay R, controls the direction and extent of rotation of the reversible motor M that moves the stylus S over a record sheet S'. The rotation of the motor armature is transmitted through the worm shaft W to the pulley P to move the cord that carries the stylus S, and also to the torsion head T of instrument I. The moving coil C of the instrument I is traversed by current from the source X which is under investigation; the source being here illustrated as a thermocouple or electrical pyrometer. Attention is particularly directed to the fact that a friction drive F is located between the motor shaft and the worm shaft W, and that an electromagnetic brake B is associated with the shaft W.

The moving coil C carries a contact arm 1 that moves between and is alternatively engaged with contacts 2, 2' as the current through the coil C varies. Contacts 2, 2' are connected to the solenoids 3, 3', respectively, and when either conatct is engaged by arm 1, the local relay circuit is completed through a solenoid, battery 4 and the contact arm. The armatures of the solenoids carry or constitute double contact switches 5, 6 and 5', 6', respectively, that are normally retained in open circuit position by springs 7.

The attachment plug 8 and flexible leads 9, 10, provide a convenient means for connecting the motor M to a suitable power source which may be batteries but is preferably the usual light or power circuit. The leads 11 from the motor field are permanently connected across the power leads 9, 10 but the armature leads 12, 13 are connected to the junction of switch arms 5, 5' and 6, 6', respectively, and the switch contacts are so connected to the power leads 9, 10, that the motor armature turns in one direction when switches 5, 6 are closed and in the opposite direction when switches 5', 6', are closed.

The friction drive F between armature shaft 14 and worm shaft W may, and preferably does, take the form of a slip clutch comprising cooperating plates 15 that are held in engagement by springs 16. The brake B is preferably of the positive locking type such as is provided by a toothed wheel 17 and a pivoted pawl or latch 18 that is yieldingly held in engagement between adjacent teeth of wheel 17 by a spring 19, and may be withdrawn from locking position by the solenoid 20 that is included in the armature circuit.

The method of operation is, in general, similar to that of known recorders of the type including an electrical measuring instrument of the adjustable torsion head type, and relay circuits actuated by the instrument to control a reversible motor which moves a stylus over a chart and "backs off" the torsion head to separate the instrument contacts when the stylus reaches the position corresponding to the then exisitng magnitude of the electrical quantity measured by the instrument.

The recorder remains at rest so long as the current flow established in coil C by the source X balances the torsion of coil spring 21 when the contact arm is between contacts 2 and 2'. If the flow of current through coil C increases, the contact arm 1 moves into engagement with contact 2 and the solenoid 3 is energized to close switches 5, 6. This completion of the armature circuit energizes solenoid 20 to release brake B and the motor M drives worm shaft W through the slip clutch F. The pulley P is rotated to move the stylus S over the record sheet S', and the torsion head T is also rotated to shift the angular position of the relatively fixed end of the coil spring 21. When the stylus S has reached a position corresponding to the increased current through coil C, the increased torsion in spring 21 withdraws arm 1 from the contact 2, thus breaking the local relay circuit and permitting spring 7 to open switches 5, 6. As these switches open, the armature circuit and the brake-releasing solenoid 20 are de-energized and the latch 18 interlocks with the teeth of wheel 17. The worm W and part operated thereby are relatively light and therefore the brake B may effect a substantially instantaneous stopping of the stylus and torsion head even though the motor M has been operated at relatively high speed. The momentum of the motor armature continues its rotation after the relay circuits are broken, but the armature may come to rest gently and without undue strain on the mechanism since the slip clutch permits overrunning of the armature.

When the current flow decreases, the relay circuit is closed through switches 5', 6' and the motor drives the pulley P and torsion head T in the opposite direction until the torsion in coil spring 21 is so reduced that the relay contacts 1, 2' are separated. The worm W is thus locked against further movement, and the slip clutch prevents the overrunning of the armature from producing false records and "hunting" of the relay contacts.

The recorder shown in Fig. 2 embodies the novel features of the Fig. 1 arrangement and has the additional advantage of extremely high sensitivity. Many of the electrical and mechanical elements are, or may be, substantially identical with those shown in Fig. 1 and are therefore identified by corresponding reference characters and numerals. The essential difference between the two recorder systems is found in the provision of vacuum tube relays between the instrument contacts and the solenoids 3, 3'. The entire recorder system illustrated in Fig. 2 is designed for operation from an alternating current power line but it will be apparent that either batteries or a direct current power line may be employed for energizing the motor and/or relay circuits.

The terminals 22, 23 of the primary of a transformer are connected to the power leads 9, 10, respectively, and a jumper 24 connects terminal 22 to one terminal 25 of the secondary winding. The filaments of the vacuum tubes V, V' are supplied, in parallel, by the portion of the secondary included between terminal 25 and a tap 26, the second terminal 27 of the secondary being connected to the contact arm 1 of the instrument I. The grids of tubes V, V' are connected to the contacts 2, 2', respectively, and are also connected through grid resistors 28, 28', respectively, to the jumper 24.

The plate circuits of tubes V, V' include the solenoids 3, 3', respectively, and a common lead 29 which is connected to the terminal 23 of the transformer primary. The solenoids 3, 3' are by-passed by condensers 30 which eliminate any chattering which might arise from the pulsating current flowing in the plate circuits.

Since alternating current is applied to the plates, the effective operation of the tubes is confined to the half-cycles when the potential of plate lead 29 is positive with respect to the filament circuit potential. The grids are normally maintained at substantially filament circuit potential by the grid resistors which are connected to jumper 24. During half-cycles when plate lead 29 has a more positive potential than jumper 24, the terminal 27 of the secondary is also positive with respect to jumper 24. The springs 7 are so adjusted that the flow of plate current is not sufficient to attract the armature when the grids are at the potential of jumper 24. When the flow of current in coil C varies to bring contact arm 1 into engagement with contact 2 or 2', the grid of that tube is given the potential of terminal 27 which, during the effective half-cycles, is more positive than the normal grid bias and therefore increases the plate current and causes its solenoid to attract its armature and close the motor armature circuit. When the instrument contacts are separated by the rotation of the torsion head, the plate current drops to its normal value and the armature is withdrawn by spring 7 to open the motor armature circuit.

Since the changes in grid potential that determine the operation of the vacuum tube relay are not accompanied by an appreciable flow of current, there is no sparking between contact arm 1 and the contacts 2, 2'. While this feature may not be of particular importance when the instrument I is designed for actuation by relatively heavy currents, it is of primary importance when very small changes in current flow are to be recorded. When the current supplied by the source X is very small, for example when the source X is a thermocouple, the instrument I must be very sensitive and its operation would be uncertain if the contacts were pitted by sparking.

The electrical and mechanical elements of the brake B are so related that the brake responds to the action of current flowing through the solenoid 20 more quickly than does the armature of the motor M. The shaft W will therefore be free to rotate whenever the motor is energized and the shaft W will be locked against rotation in either direction as soon as the relay circuits are broken. When this occurs, the motor armature may come to rest gently, while the slip clutch F prevents overrunning of the stylus and torsion head. The recorder may therefore be operated at stylus speeds of an order substantially higher than any previously employed, and by actual tests I have found that overrunning is substantially suppressed even though the stylus speed is raised to the order of from six to ten inches per second. Furthermore, this high speed was obtained with a sensitive indicating instrument and with the relay contacts closely adjusted for the recording of minute changes in the electrical quantity under investigation.

Greater freedom in the design of the friction drive and brake may be had if the motor is of the type having a circuit arranged for dynamic braking of the armature, and such braking at the motor is usually desirable but, in general, is not essential.

It will be apparent that the invention is not limited to the specific constructions herein illustrated and described. It is obvious that the invention may be applied to recorders of the type in which the torsion head rotates the fixed contacts instead of the contact arm and moving coil, and also to recorders of the "potentiometer" type in which the movement of the stylus is accompanied by a proportional adjustment of a contact over a slide wire or other resistance. The mechanical design of the parts of the recorder is also subject to wide variation, for example, the friction drive may take the form of a belt and pulley system, or other types of slip clutches may be used.

For convenience of description, and in view of the specific embodiments shown in the drawings, the complete assembly has been referred to as a recorder but it will be apparent that the invention may be incorporated in distant-reading instruments of the type in which a pointer moves over a scale but does not form a permanent record upon a moving chart.

I claim:

1. A recorder of the type including a motor for moving a stylus over a record sheet, characterized by the fact that the connections between said motor and stylus include a friction drive, and a brake operative to arrest the movement of said stylus when the motor circuit is opened, whereby slipping of the friction drive prevents the inertia of the motor from actuating said stylus after the opening of the motor circuit.

2. A recorder of the type including a record sheet, a stylus, a motor for moving said stylus in opposite directions upon said record sheet, and a relay controlling the extent and direction of operation of said stylus, characterized by the fact that the driving connections between said motor and stylus include a shaft for actuating said stylus, a slip clutch between said shaft and said motor, and a brake for arresting the rotation of said shaft when the relay circuit is broken.

3. A recorder of the type including a motor for moving a stylus over a record sheet, a relay circuit network controlling said motor to determine the time and direction of movement of said stylus, and a measuring instrument having a contact arm controlling said relay circuit network, characterized by a friction drive connection between said motor and stylus, a brake for arresting the movement of said stylus, and an electromagnet for releasing said brake, the solenoid of said magnet being included in said relay circuit network and traversed by current to release said brake only when said instrument contact arm establishes circuit connections operative to cause actuation of said stylus by said motor.

4. An electrical measuring instrument of the recorder type comprising a measuring instrument having a contact arm alternatively engageable with two spaced contacts for closing relay circuits, a record sheet, a stylus, a motor and driving connections including a slip clutch for moving said stylus upon said record sheet, a mechanical brake operating upon said driving connections between said clutch and said stylus, and an electromagnet controlled by said relay circuits for releasing said brake only during periods when said stylus is to be actuated by said motor.

5. In an electrically operated recorder, the combination with a record sheet, a stylus movable over said sheet, a motor, a relay circuit controlling the actuation of said stylus by said motor, and an electrical indicating instrument controlling said relay circuit, of a drive shaft associated with said stylus, a slip clutch having the respective parts thereof connected to said motor and said drive shaft, a mechanical brake for locking said drive shaft against rotation, and an electromagnet controlled by said relay circuit for releasing said brake during periods when said instrument establishes relay circuit connections effective to cause actuation of said stylus by said motor.

6. The invention as set forth in claim 5, wherein the time-response characteristic of said brake and electromagnet is less than the time-response characteristic of said motor.

7. A recorder of the type including a motor for moving a stylus over a sheet, and relay circuits for determining the time and direction of movement of said stylus, characterized by the fact that a spring-actuated brake is provided for locking said stylus against movement, and a solenoid for releasing said brake is included in the said relay circuits.

8. In a device of the type stated, the combination with an electrical measuring instrument including a contact arm movable between two contacts, a motor, an element movable in opposite directions over a path of predetermined extent, means for actuating said element by and in accordance with the direction of movement of said motor, relay circuits including said contact arm and contacts for determining the time and direction of movement of said motor, of means to prevent movement of said element during the intervals between the opening of relay circuits to the motor and the stopping of the motor, said motion preventing means comprising a friction drive included in said actuating means, and an electromagnetic brake for arresting the movement of said element when the said relay circuits to said motor are opened.

9. In a recorder, the combination with an instrument including a contact arm movable between two contacts, a motor for moving a pointer in opposite directions over a chart, of a source of energy for actuating said motor, switches and circuit elements for establishing two alternative circuits between said source and motor to determine the direction of rotation of said motor, a pair of solenoids for actuating said switches, a pair of vacuum tubes, the said solenoids being located in the respective plate circuits of said tubes, means establishing upon the grids of said tubes normal bias potentials of such value that the plate current through said solenoids is not effective to close said switches, and means including said instrument contact arm and contacts for establishing alternatively upon the grids of said tubes bias potentials of a value effective to change the plate current through one of said solenoids to actuate the switch associated therewith.

10. In a recorder, a stylus movable over a chart, a motor and drive connections for moving said stylus in opposite directions over said chart, a measuring instrument including a contact arm and a pair of contacts, a pair of vacuum tubes having the grids thereof connected to the respective contacts, a solenoid in the plate circuit of each tube, switches actuated with each solenoid and controlling two circuits that determine the time during and the direction in which said motor moves said stylus, and a single source of energy for supplying power to said motor, for energizing the circuits of said tubes, and for developing between said contact arm and the cathodes of said tubes a potential of such magnitude that engagement of said contact arm and one of said contacts establishes a plate current flow effective to actuate the solenoid-actuated switch of the tube associated with the said contact.

11. In a recorder operable at high stylus speed, the combination with a measuring instrument having a contact arm alternatively engageable with two spaced contacts, a vacuum tube associated with each contact, electromagnetic switches having the solenoids thereof included in the plate circuits of the respective tubes, of a stylus movable over a chart, a motor and connections for moving said stylus in opposite directions, a friction drive included in said connections, a brake normally locking said stylus against movement, relay circuits including said switches for energizing said motor, and a solenoid for releasing said brake included in said relay circuits.

12. The combination with a stylus, a chart, a motor for moving said stylus in opposite directions over said chart, a brake for locking said stylus against motion, and a friction drive between said motor and stylus, of a measuring instrument including a contact arm and a pair of contacts, relay circuits including vacuum tubes for determining the periods during and direction in which said motor actuates said stylus, and circuit elements including said contact arm and contacts for varying the operating potentials applied to said vacuum tubes to thereby control said relay circuits.

13. In an electrically operated recorder, the combination with a record sheet, a stylus and a motor for moving said stylus over said record sheet, of an electrical measuring instrument having terminals for connection with the electrical circuit under investigation, said instrument including a contact arm movable between two contacts, a pair of vacuum tubes having in the respective plate circuit thereof the solenoids of magnetically-operated switches, circuit elements including said control arm and said contacts for alternatively applying to said tubes a grid bias effective to actuate the respective switches, and power circuits including the said switches for energizing said motor.

14. In an electrically operated recorder, the combination with a record sheet, a stylus and a motor for moving said stylus over said record sheet, of an electrical measuring instrument having terminals for connection with the electrical circuit under investigation, said instrument including a contact arm movable between two contacts, a pair of vacuum tubes having in the respective plate circuits thereof the solenoids of magnetically-operated switches, circuit elements including said contact arm and said contacts for alternatively applying to said tubes a grid bias effective to actuate the respective switches, power circuits including the said switches for energizing said motor, and circuit connections for energizing said power circuits and the circuits of said vacuum tubes for a single source of power.

EDWARD F. WESTON.